(12) United States Patent
Lehto

(10) Patent No.: US 7,447,192 B1
(45) Date of Patent: Nov. 4, 2008

(54) SYSTEM AND METHOD FOR CONTROLLING A MEDIA GATEWAY

(75) Inventor: Pekka Lehto, Oulu (FI)

(73) Assignee: Spyder Navigations L.L.C., Wilmington, DE (US)

( * ) Notice: Subject to any disclaimer, the term of this patent is extended or adjusted under 35 U.S.C. 154(b) by 829 days.

(21) Appl. No.: 10/297,993

(22) PCT Filed: Jun. 13, 2000

(86) PCT No.: PCT/EP00/05430

§ 371 (c)(1),
(2), (4) Date: Jun. 23, 2003

(87) PCT Pub. No.: WO01/97481

PCT Pub. Date: Dec. 20, 2001

(51) Int. Cl.
H04L 12/28 (2006.01)
H04L 12/56 (2006.01)
H04L 12/66 (2006.01)

(52) U.S. Cl. .................................. 370/352; 370/401
(58) Field of Classification Search ................ 370/401, 370/351, 389, 400, 352, 353, 354
See application file for complete search history.

(56) References Cited

U.S. PATENT DOCUMENTS

| 6,683,877 | B1 * | 1/2004 | Gibbs et al. | 370/395.2 |
| 6,826,176 | B1 * | 11/2004 | Siddiqui et al. | 370/352 |
| 6,832,254 | B1 * | 12/2004 | Scoggins et al. | 709/227 |
| 2004/0022237 | A1 * | 2/2004 | Elliott et al. | 370/356 |

OTHER PUBLICATIONS

F. Cuervo et al., "Megaco Protocol", Jan. 27, 2000, draft-ietf-megaco-protocol-05.txt, pp. 10, 15-17, 71-100.*
International Search Report.
Matt Holdrege, "2.7.6 Media Gateway control (Megaco)" 46th IETF Conference Proceedings/ Meeting Minutes, Online! Nov. 7-12, 1999, XP002167872.
M. Arango, et al., "Media Gateway Control Protocol (MGCP) Version 1.0", Internet Specification RFC, Oct. 31, 1999, pp. 1-16, XP002162189.
B.H. Hornbach, "MML CCITT Man-Machine Language", New Orleans, Nov. 29-Dec. 3, 1981, New York, XP000839656.
Danny Cohen, et al., PacketWay Enumberations >> Draft Specification Packetway, Sep. 1997, XP002167873.
Anquetil, et al., "Media Gateway Control Protocol and Voice over IP Gateways, MGCP and VOIP Gateways will Offer Seamless Interworking of New VOIP Networks with Today's Telephone Networks", Electrical Communication, Alcatel. Brussels, BE, Apr. 1, 1999, pp. 151-157, XP000830045.

* cited by examiner

Primary Examiner—Hassan Kizou
Assistant Examiner—Betty Lee

(57) ABSTRACT

A method and system including at least one media gateway and at least one media gateway controller controlling the media gateway. The media gateway uses structured termination identities for identifying terminations on the media gateway that source and/or sink media and/or control streams. In order to assure a correct specifying of one or more terminations of the media gateway, the media gateway controller contains, or has access to, structure information of the structure of the termination identities. The structure information describes the bit sequence and/or the information represented by the bits or bit sections of the termination identities. Therefore, wildcarding commands can be properly defined.

30 Claims, 3 Drawing Sheets

| MML | MG | ORD | TSLB | PCMB | CGRB |
|-----|------|-----|------|------|------|
| JTY | GW537 | LSF | 7-0 | 23-8 | 31-24 |

SYSTEM AND METHOD FOR CONTROLLING A MEDIA GATEWAY

FIELD OF THE INVENTION

The invention relates to a method and system comprising at least one media gateway and media gateway controller for controlling the media gateway. Furthermore, the invention relates to a media gateway controller, in particular for use in such a system or method.

BACKGROUND OF THE INVENTION

The Technical Specifications TS101 313 V0.4.2 (1999-02) and TS101 316 V1.1.1 (1999-04) of ETSI (European Telecommunications Standards Institute), describe a network architecture and configurations e.g. for TIPHON (telecommunications and internet protocol harmonization over networks), and illustrate a basic call reference configuration comprising a decomposed gateway. The decomposed gateway includes a media gateway controller and a media gateway controlled by the controller, and eventually a signaling gateway. The media gateway controller provides the connection processing (e.g. call handling) functions for the gateway. The media gateway is a device operating on media and/or control streams.

The decomposing of the gateway into the gateway function and the gateway control is of advantage as it allows an easy change of the control strategy and parameters without necessity of changing the physical gateway structure. Generally, a gateway can be an end point on a network which provides a connection, e.g. real-time, two-way communication, between terminals of two networks, for instance a packet-based network and a circuit-switched network. The information flow between the media gateway and the media gateway controller supports several functions such as creation, modification and deletion of media stream connections across the media gateway; the specification of transformations to be applied to media streams passing through the media gateway; the request of insertion of tones and announcements into media streams; and/or the request of reports and specific actions to be taken upon detection of specified events within the media streams.

Examples of media gateways may include trunk gateways that interface between SCN (Switched Circuit Networks) networks and packet-based networks such as IP (Internet Protocol) networks; "Voice over ATM (Asynchronous Transfer Mode)" gateways which provide interface to an ATM network; access gateways that provide interfaces between "user to network" interfaces and "Voice over IP" networks; residential gateways, i.e. access gateways for a small number of voice terminals that can be co-located with a cable modem or set top box; network access servers; multipoint processing units; IP gateways; fax gateways that may be used to relay Fax Group 3 calls between an IP network and an SCN, and the like. Usually, the media gateway will be physically connected to one or more packet-switched networks and to one or more circuit switched networks. Calls handled by the decomposed gateway may comprise pure data transmission, voice transmission, for instance over a packet-based network, i.e. a network using packet transmission instead of switched circuit network configuration; audio data; video data, combined audio and video data, and the like. The definitions and examples mentioned in the above referenced documents are herewith included into the disclosure contents of the present file.

One or more of these different functions can be co-located and may also be combined with gatekeepers or with other gateways. The signalling gateway may provide the signalling mediation function between the packet-based domain such as the IP domain, and the circuit switched network (SCN) domain. The media gateway provides the media mapping and/or transcoding functions, and maps (e.g. tandem free operation) or transcodes the media in the packet-switched domain (e.g. media transported over RTP/UDP/IP or the like) and media in the SCN domain (e.g. PCM encoded voice, GSM (Global System for Mobile Telecommunications), etc.). The media gateway controller controlling the media gateways receives e.g. SCN signalling information from the signalling gateway and IP signalling from the gatekeeper.

Draft Recommendation H.248/MEGACO issued by ITU (International Telecommunications Union), defines protocols used between elements of a physically decomposed multimedia gateway, e.g. between a media gateway controller (MGC) and a media gateway (MG). This draft recommendation expressly does not define how network elements (such as gateways) work and are to be implemented. A media gateway usually provides two or more terminations e.g. for RTP streams or SCN (Switched Circuit Network) bearer channels. Generally, a termination is a logical entity on a media gateway that sources and/or sinks media and/or control streams. Terminations normally have unique identities (termination identities, i.e. terminationIDs) which are assigned by the media gateway at the time of creation of the terminations. Terminations representing physical entities have a semi-permanent existence. For example, a termination representing a TDM channel might exist for as long as it is provisioned in the gateway.

The terminations are referenced by their assigned termination identities which is an arbitrary schema chosen by the media gateway. TerminationIDs of physical terminations may be provisioned in the media gateway. The terminationIDs may be chosen to have structure. For instance, a terminationID may consist of trunk group and a trunk within the group.

As furthermore mentioned in the draft recommendation H.248/MEGACO, a wildcarding mechanism using two types of wildcards can be used with terminationIDs. The two wildcards are ALL and CHOOSE. The former is used to address multiple terminations at once, while the latter is used to indicate to a media gateway that it must select a termination satisfying a partially specified terminationID. This allows, for instance that a media gateway controller instructs a media gateway to choose a circuit within a trunk group.

As described above, the media gateway chooses the syntax for the terminationIDs so that the terminationIDs may have different kinds of syntaxes or structures. For instance, a terminationID may consist of a trunk group, a trunk within the group and a circuit, or of a trunk group and a trunk within the trunk group. Moreover, the position or sequence of bits referring to e.g. a trunk group may be different from gateway to gateway, or even within a gateway at different times. The media gateway controller may therefore incorrectly specify terminationIDs, e.g. when using a wildcarding schema and defining only part of terminationIDs. A desired connection may then be incorrectly handled by the media gateway.

SUMMARY OF THE INVENTION

The invention proposes a solution for overcoming the above-mentioned problems and provides, according to one aspect, a system comprising at least one media gateway and at least one media gateway controller controlling the media gateway, the media gateway comprising or using structured termination identities for identifying terminations on the media gateway that source and/or sink media and/or control streams. The media gateway controller contains, or has access to, structure information informing the media gateway controller on the structure of the termination identities.

The structure information preferably describes the bit sequence and/or the information represented by the bits or bit sections of the termination identities.

The media gateway controller may be adapted to use the structure information for defining one or more commands such as wildcard commands for simultaneously specifying some or all of the terminations of said media gateway.

In one embodiment, the media gateway may be adapted to send information to the media gateway controller informing the media gateway controller on the structure of the termination identities of its terminations.

In another embodiment, the media gateway controller can be adapted to send structure information to the media gateway informing the media gateway on the structure of the termination identities to be used for the terminations of the media gateway, the media gateway being adapted to generate termination identities structured in accordance with the structure information received from the media gateway controller.

The media gateway controller preferably comprises, or cooperates with, a management interface for defining or provisioning the structure of the termination identities of the terminations of one or more media gateways.

The syntax of the termination identities may be described in a MML (Man-Machine Language) format.

The media gateway controller and/or media gateway can be adapted to send the structure information to the other component, i.e. the media gateway or the media gateway controller. Herefor, e.g., a MML command can be used.

Furthermore, predetermined restrictions for selection and/or defining the structure of the terminationIDs may be provided both in the media gateway and media gateway controller. These restrictions ensure that the structure will always have a definite form. As these restrictions are common in both the media gateway and the media gateway controller, and are known in both media gateway and media gateway controller, the resulting definite form of the structure of the terminationIDs is also known in the media gateway and media gateway controller, without any need of actually exchanging information on the structure of the terminationIDs.

Preferably, the structure information comprises a parameter defining the media gateway type to which the structure of the termination identities refers; a parameter defining the order of one or more bit sequences in the structure information; a parameter defining that part of the structure information which relates to circuit information; a parameter defining that part of the structure information which relates to trunk information; and/or a parameter defining that part of the structure information which relates to trunk group information.

Moreover, according to a further aspect of the invention, a method is provided which is to be performed in a system comprising at least one media gateway and at least one media gateway controller controlling the media gateway, preferably in a system according to any one of the above described aspects, wherein the media gateway comprises structured termination identities for identifying terminations on the media gateway that source and/or sink media and/or control streams, wherein the media gateway controller contains or accesses structure information indicating the structure of the termination identities, for specifying one or more of the terminations of the media gateway.

Further, according to another aspect of the invention, a media gateway controller is provided which is preferably adapted to be used in such a system and/or method as defined above.

According to a further aspect of the invention, a media gateway means is provided which includes a media gateway and a media gateway controller structured and/or functioning as defined above, and/or in the following description.

In accordance with the invention, the media gateway controller is assisted in correctly handling structured termination identities. The media gateway controller contains, or has access to, structure information specifying the structure of the terminationIDs of the one or more media gateways controlled by the media gateway controller. Therefore, the media gateway controller correctly knows, if necessary, the syntaxes of the terminationIDs assigned by the media gateway(s) to its/their terminations.

The media gateway controller can therefore properly distinguish between different termination identities consisting for example in one media gateway at a certain time of a trunk group, a trunk within a group and a circuit within a trunk, or, in another media gateway or to another time, only of a trunk group and a trunk within a group.

The media gateway controller can therefore correctly understand and specify termination identities.

This advantage is provided irrespective of the actual encoding method used for the protocol, for instance, ASN.1 and ABNF, as mentioned in the draft specification H.248.

In accordance with the preferred implementation of the invention, the media gateway controller is provisioned with information on the structure of the termination identities. This information may be provided using a management interface in the media gateway controller. This knowledge about the structure of the termination identities used in one or more media gateways enables the media gateway controller to correctly understand or address one or more terminations of the media gateway(s). Even when the structure of the termination identities should be different in different media gateways, e.g. in different types of media gateways, the media gateway controller is able to generate commands appropriate for a respective media gateway or its terminations, and to evaluate information received via terminations of a media gateway.

The structure information preferably describes the bit sequence and/or the information represented by the bits or bits sections of the termination identities, and thus defines the basic structural concept of the termination identities, irrespective of the actual state of the bits, or the information contents defined by an actually provided termination identity.

The media gateway controller is therefore able to define, taking account of the structure information related to the termination identities, specific commands for specifying one of the terminations of a media gateway, and also to define one or more wildcard commands for simultaneously specifying two or more and even all of the terminations of the media gateway(s).

Proper functioning of the system is hence ensured.

According to one of the preferred embodiments, the media gateway(s) is first defining the structure of the termination identities and identifiers of physical terminations, for instance when initialising the gateway or system. The media gateway(s) may then send a message (notification) to the associated media gateway controller informing the latter on the chosen structure of the syntax of the termination identities. The media gateway controller may store this information for future use when addressing one or more (e.g. wildcard commands) terminations of that media gateway.

The media gateway controller may also be implemented to provision, e.g. using a management interface, a structure of the termination identities of the media gateway(s) controlled by the media gateway controller. The media gateway controller may be adapted to send this structure information to the media gateway(s) which then define the termination identities for their terminations in accordance with the provisioned syntax structure.

The syntax of the termination identities may be described in any appropriate format understandable by the media gateway controller and/or media gateway(s). In an example implementation of the invention, an MML format (Man-Machine Language) is used. The media gateway controller may e.g. be provided with a MML interface allowing a person to input commands in an appropriate format (MML format) for defining a structure of the termination entities.

Preferably, the structure information describing the structure of the termination identities comprises one or more of the following parameters such as a parameter defining the type of media gateway for which the described syntax or structure of the termination entities applies, a parameter defining the order of one or more bit sequences in the structure information which parameter e.g. defines whether the most significant bit (MSB) of a byte is positioned at the begin or end of a byte or bit section, a parameter defining which part of the structure information relates to TSL information, which part relates to PCM information, and/or which part relates to the trunk group information or trunk information.

DETAILED DESCRIPTION OF PREFERRED EMBODIMENTS OF THE INVENTION

Figure 1:
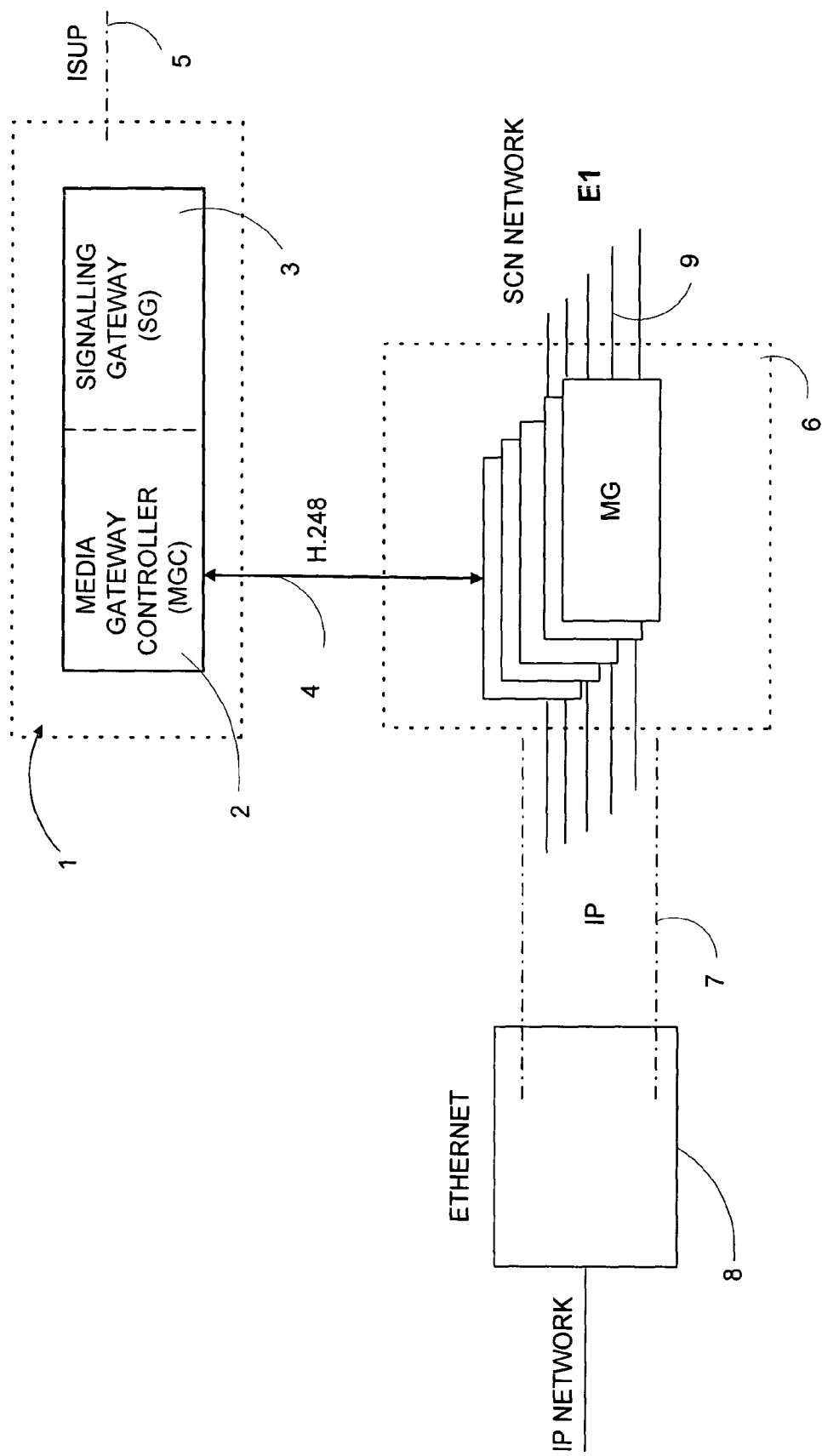
FIG. 1 shows a basic structure of an embodiment of a system in accordance with the present invention.

FIG. 1 shows the basic structure of one embodiment of a system in accordance with the present invention. The system shown in FIG. 1 comprises a common channel signalling unit 1 which incorporates a media gateway controller (MGC) 2 and is connected to one or more media gateways (MG) 6 via a line or channel or path (e.g. virtual path or connection) 4. The communication via path 4 may be based on H.248 protocol and e.g. be of "ETHERNET"-type. The unit 1 may be located anywhere in a network such as PSTN (Public Switched Telecommunication Network), and controls and responds to e.g. SS7 (Signalling System 7) circuits, or circuits of any other type.

The unit 1 comprises, in addition to the media gateway controller 2, a signalling gateway 3 which is connected to a line 5 (e.g. ISUP, i.e. ISDN user part) for receiving e.g. call initiating and terminating signals and the like. The media gateway 6 preferably provides a connection between an SCN network (paths or lines 9) and an IP-based (IP, Internet Protocol) path 7 and may consist of only one or, as shown, several similar parts or gateways for handling the signals/data to be transmitted by the individual lines of the switched circuit network and/or different IP-based channels.

The interface between the media gateway controller 2 and the media gateway 6 may be ETHERNET-based or based on another appropriate network interconnection model. The media gateway(s) 6 provide e.g. RADIUS (Remote Authentication Dial in User Service) service for authentication, layer 2 tunnelling using L2TP (Layer 2 Terminal Protocol) and the like, and may be arranged to forward incoming or outgoing connections to and from an access node 8 (e.g. ETHERNET-based) through a L2TP tunnel. The access node 8 may be a router for the internet with access server functionality.

In the decomposed gateway model shown in FIG. 1, the media gateway controller 2 controls the resources of the media gateway(s) 6 via an appropriate media gateway control protocol such as MEGACO/H.248 or MGCP (Media Gateway Control Protocol), or the like. Generally, the media gateway(s) 6 converts media (information e.g. of multimedia type consisting of, or comprising audio information, video information, data and/or other type of information) provided in one type of network to a format required in another type of network. For example, the media gateway(s) 6 terminate bearer channels from a switched circuit network connected to lines 9, and media streams from a packet-based network (connections 7). The media gateway controller 2 controls e.g. the parts of the call state that pertain to connection control for media channels in the media gateway(s) 6.

Figures 2, 3:
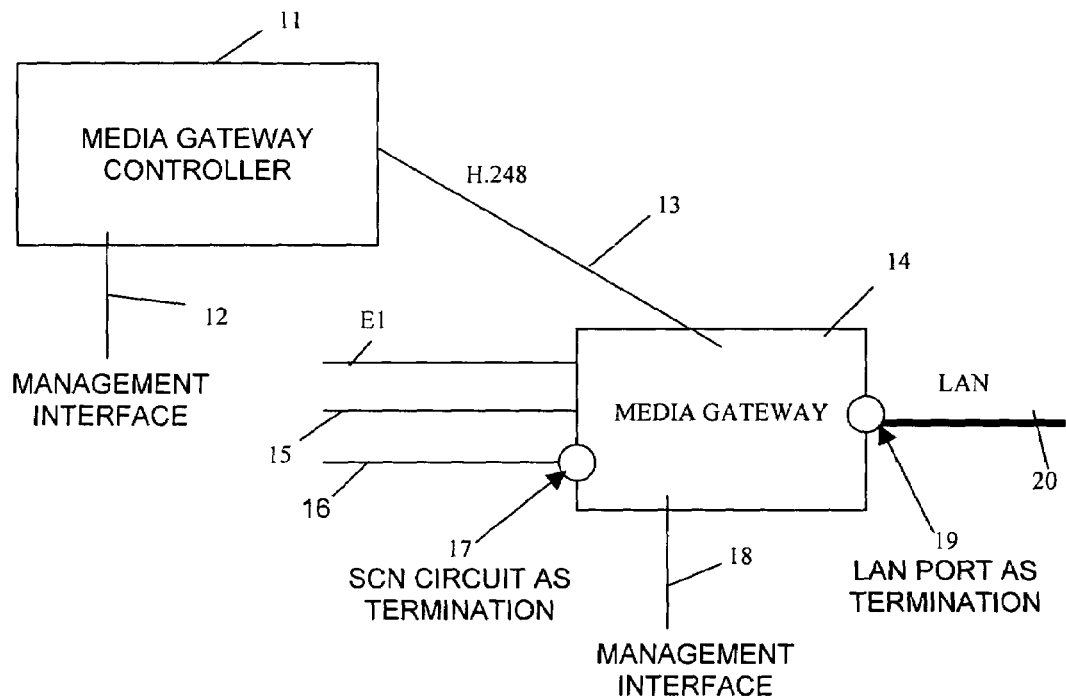
FIG. 2 shows an embodiment of a decomposed media gateway in accordance with the present invention.
FIG. 3 shows an embodiment of a structure information used in a system or method according to the present invention, for describing the structural syntax of one or more termination identities.

FIG. 2 shows the basic structure of a media gateway means arranged in accordance with the invention, in more detail. A media gateway controller 11 comprises an internal or peripheral management interface 12 for provisioning the structure (syntax) of termination entities (terminationIDs) used in media gateway 14. The media gateway 14 communicates with media gateway controller 11 by means of a communication channel 13 which may be a permanent connection or be established only if required. The communication via communication channel 13 may be performed based on H.248 protocol. The media gateway 14 provides connections to a switched circuit network such as indicated by lines E1, 15 and 16, and to a local area network (LAN) 20. The media gateway 14 comprises terminations for connection to the networks such as a termination 17 providing a SCN circuit termination, and termination 19 representing a LAN port termination. The types and number of terminations of the media gateway 14 will depend on, and be adapted to, the types and number of networks to be connected to the media gateway 14.

Similar to management interface 12 of media gateway controller 11, the media gateway 14 comprises an internal or external management interface represented by reference numeral 18. This management interface serves for transmitting information such as commands to, and receiving information such as messages from, the media gateway 14 or other devices. The management interfaces 12 and 18 may also be connected to an appropriate man-operable or programmable superordinate stage such as maintenance and service operation.

According to the draft recommendation H.248, two encoding method for the protocols are defined, i.e. ASN.1 (Abstract Syntax Notation One), and ABNF (Augmented Backus-Naur Form). According to the ASN.1 notation of the syntax of messages, termination identities may consist of octet strings of up to 8 octets in length. A termination identity thus consists of up to 64 bits.

The ABNF description defines the following:

```
terminationIDList =    LBRKT TerminationID *
                       (COMMA Termination ID) RBRKT
; Total length of pathNAME must not exceed 64 chars.
pathNAME         =     ["*"] NAME * ("/" / "*" / ALPHA/DIGIT /
                       "_" / "$" )
                       ["@" pathDomainName]
; ABNF allows two or more consecutive "." although it is
; meaningless in a path domain name.
PathDomainName   =     (ALPHA / DIGIT / "*")
                       *63 (ALPHA / DIGIT / "–" /"*" / ".")
TerminationID          = "ROOT" /pathNAME / "$" / "*".
```

The structure(s) of the termination identities is/are provisioned using the management interface 12 in the media gateway controller 11. By means of this management interface 12, the structure of the termination identities can be defined. The structure of the termination identities may also be different in every kind of media gateway. Knowledge of the structure of the termination identities in the media gateway controller 11 enables the latter to correctly decode and/or address or specify desired termination identities. Moreover, wildcarding mechanism can be appropriately devised in the media gateway controller 11.

By this provision of the termination identities of physical terminations in the media gateway controller, e.g. via the management interface 12, it is possible to define, for instance, in which part of the structure the E1 trunk (PCM, Pulse Code Modulation) and circuit (TSL, Timeslot) is defined; in which part of the structure the trunk group is defined; where in the structure fields are the most significant bits; is there any separator characters in the structure (and, if so, which characters); and the like.

The structure or syntax of the termination identities is shown in FIG. 3 by way of an example. Here, a MML (Man-Machine Language) command is used for defining the structure of the termination identities for ASN.1. When an ABNF protocol is used, the command may likewise be a MML command for defining the structure of the termination identities.

The first row of the table of FIG. 3 lists the meaning of the individual parts of a structure of a terminationID whereas the second row of the table of FIG. 3 lists the command type and values of the parts of the structured terminationID.

According to FIG. 3, the command is essentially as follows: JTY:MG=GW537; ORD=LSF; TSLB=7-0; PCMB=23-8; CGRB=31-24:.

JTY is the MML command. The parameter MG defines which type of media gateway the command concerns. GW537 is an example value for identifying the media gateway type. The parameter ORD defines where the most significant bits are positioned. LSF is an example value which means that in the protocol, the "bit 1" is sent first, followed by bits 2, 4 .... The least significant bit is therefore always send first, followed by the bits in increasing significance. Similarly, the octet 1 shall be sent first, followed by octets 2, 3 and the like.

The parameter TSLB defines in which part of the structure the circuit (TSL) bits are arranged. 7-0 is an example value, meaning that the bits 0 . . . 7 are used for circuit information. The parameter PCMB defines in which part of the structure the trunk (PCM) bits are positioned. 23-8 is an example value meaning that the bits 8 . . . 23 are used for trunk information.

The parameter CGRB defines in which part of the structure the trunk group bits are located. 31-24 is an example value meaning that the bits 24 . . . 31 are used for trunk group information.

The structure of the termination identities used in the media gateway 14 may also be described using other commands or languages of other types.

Figure 4:
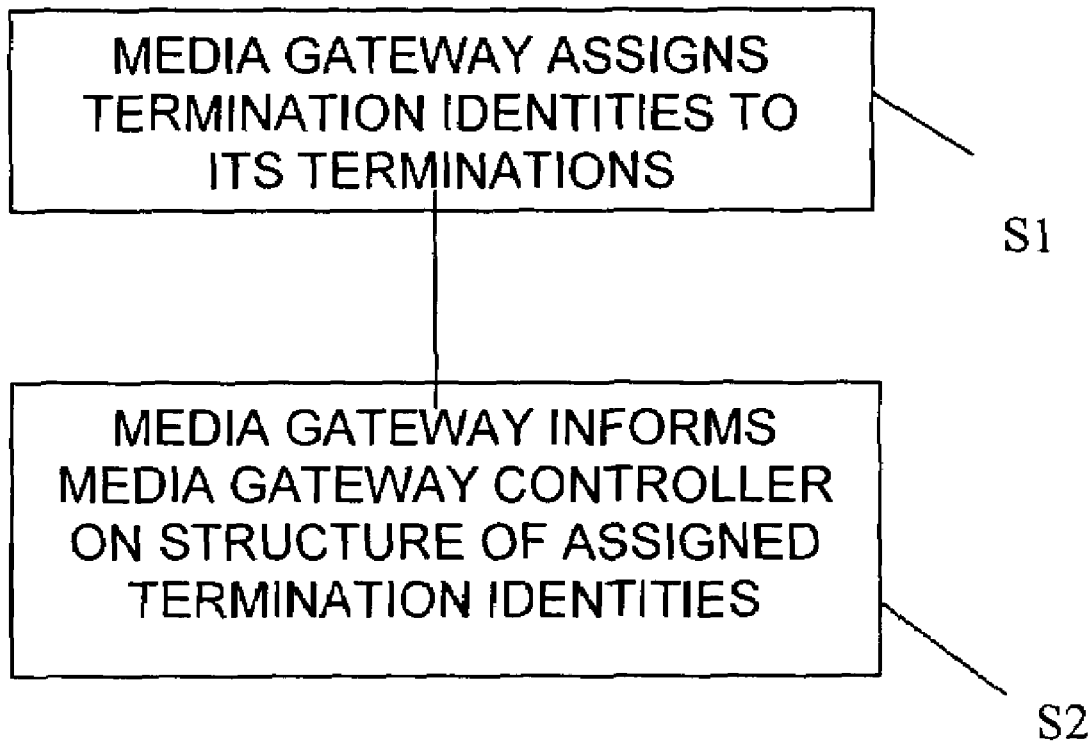
FIG. 4 shows basic steps of an embodiment of a method in accordance with the present invention.

FIG. 4 shows the basic method steps performed in a method according to an embodiment of the invention. In step S1, the media gateway 6 or 14 assigns a termination identity (terminationID) to each termination at the time of its creation. This termination may have a semi-permanent existence or may e.g. represent ephemeral information flows which exist only for the duration of their use. The media gateway controller is adapted to store this structure information and therefor e.g. forms and stores a table listing the structure of the termination identities used in the different media gateways controlled by the media gateway controller. Preferably, the structure of termination identities created within a media gateway is identical for all terminations thereof, but may vary from media gateway to media gateway. In such a case, a new media gateway type definition has to be provisioned to the media gateway controller.

When the media gateway has assigned a termination identity to each newly created termination, it may inform the media gateway controller 2 or 11 on the structure of the assigned termination identities, at least of the termination identities specified for semi-permanent terminations. This notification corresponds to step S2 shown in FIG. 4 and is performed using the connection 4 or 13.

As an example, same information as in a MML command, such as shown in FIG. 3, is sent to the media gateway controller from the media gateway.

In one embodiment, the media gateway will send the structure information only once to the media gateway controller, e.g. when initializing the system or network, media gateway or media gateway controller. As an alternative, the structure of termination identities may also be variable within one and the same media gateway. In this case, the media gateway controller stores a list of information on the different structures of the termination entities used within this media gateway. In any case. The stored list represents the structure or syntax of the termination entities used in one or more media gateways.

The media gateway controller is accessing this structure information when specifying one or more terminations, e.g. when generating wildcard commands such as ALL or CHOOSE for specifying all or only one or more of the terminations of one or more media gateways.

As an alternative, the media gateway controller may also be arranged to generate structure information representing a preferred structure of termination identities to be generated within one or more media gateways, and to send this structure information to the media gateway(s). Upon receipt of such structure information, the media gateway(s) is/are adapted to store this structure information and to create new termination identities in accordance with the termination identity structure represented by this structure information.

According to another embodiment, the generation rules for generating terminationIDs may be fixed or at least restricted both in the media gateway(s) and media gateway controller(s). The media gateway controller will therefore know the structure of the terminationIDs provisioned in the media gateway, and is hence able to correctly specify desired terminationIDs or groups of terminationIDs.

Although preferred embodiments have been described above in detail, the invention is not restricted thereto and intends to cover any modification, generalisation or variation of the disclosed teaching.

What is claimed is:

1. A system comprising:
at least one media gateway and at least one media gateway controller controlling the media gateway,
wherein the media gateway comprises structured termination identities provisioned in the media gateway for identifying terminations on the media gateway that source or sink media or control streams,
wherein the media gateway controller has access to structure information for informing the media gateway controller of the structure of the termination identities,
wherein the structure information describes a bit sequence of the termination identities,
wherein the media gateway controller is configured to send the structure information to the media gateway informing the media gateway of the structure of the termination identities to be used for the terminations of the media gateway, the media gateway configured to generate the structured termination identities in accordance with the structure information received from the media gateway controller.

2. A system comprising:
at least one media gateway and at least one media gateway controller controlling the media gateway,
the media gateway comprising structured termination identities provisioned in the media gateway for identifying terminations on the media gateway that source/or sink media or control streams,
wherein the media gateway controller has access to structure information informing the media gateway controller of the structure of the termination identities,
wherein the structure information describes a bit sequence of the termination identities,
wherein generation rules for generating termination identities in the media gateway are fixed and the media gateway controller has knowledge of the fixed generation rules.

3. A system comprising:
at least one media gateway and at least one media gateway controller controlling the media gateway, the media gateway comprising structured termination identities provisioned in the media gateway for identifying terminations of the media gateway that source or sink media or control streams,
wherein the media gateway controller has access to structure information informing the media gateway controller of the structure of the termination identities,
wherein the structure information describes a bit sequence of the termination identities,
wherein the structure information comprises a parameter defining the media gateway type to which the structure of the termination identities refers.

4. A system according to claim 2 or 3, wherein the media gateway controller uses the structure information for defining one or more commands for simultaneously specifying some or all of the terminations of said media gateway.

5. A system according to claim 2 or 3, wherein the media gateway sends information to the media gateway controller informing the media gateway controller of the structure of the termination identities of the terminations.

6. A system according to claim 2 or 3, wherein the media gateway controller sends the structure information to the media gateway informing the media gateway of the structure of the termination identities to be used for the terminations of the media gateway.

7. A system according to claim 2 or 3, further comprising a management interface for defining or provisioning the structure of the termination identities of the terminations of one or more media gateways.

8. A system according to claim 2 or 3, wherein the syntax of the termination identities is described in a MML (Man-Machine Language) format.

9. A system according to claim 2 or 3, wherein the structure information comprises a second parameter defining the order of one or more bit sequences in the structure information.

10. A system according to claim 2 or 3, wherein the structure information comprises a second parameter defining that part of the structure information which relates to circuit information.

11. A system according to claim 2 or 3, wherein the structure information comprises a second parameter defining that part of the structure information which relates to trunk information.

12. A system according to claim 2 or 3, wherein the structure information comprises a second parameter defining that part of the structure information which relates to trunk group information.

13. A method to be performed in a system comprising at least one media gateway and at least one media gateway controller controlling the media gateway, the method comprising:
a media gateway controller accessing structure information indicating a structure of termination identities of a media gateway for specifying one or more terminations of the media gateway, wherein the structure information describes a bit sequence of the termination identities;
the media gateway controller sending the structure information to the media gateway informing the media gateway of the structure of the termination identities to be used for the terminations of the media gateway;
the media gateway receiving the structure information; and
the media gateway generating termination identities structured in accordance with the structure information received from the media gateway controller.

14. A method to be performed in a system comprising at least one media gateway and at least one media gateway controller controlling the media gateway, the method comprising:
the media gateway identifying terminations on the media gateway that source or sink media or control streams; and the media gateway controller accessing structure information indicating the structure of termination identities, for specifying one or more of the terminations of the media gateway,
wherein the structure information describes a bit sequence of the termination identities, wherein generation rules for generating termination identities in the media gateway are fixed, and the media gateway controller has knowledge of the fixed generation rules.

15. A method to be performed in a system comprising at least one media gateway and at least one media gateway controller controlling the media gateway, the method comprising:
identifying terminations of the media gateway that source or sink media or control streams; and the media gateway controller accessing structure information indicating the structure of termination identities for specifying one or more of the terminations of the media gateway, wherein the structure information describes a bit sequence of the termination identities, wherein the structure information comprises a parameter defining the media gateway type to which the structure of the termination identities refers.

16. A method according to claim 14 or 15, wherein the media gateway controller defines, using the structure information, one or more wildcard commands for simultaneously specifying some or all of the terminations of said media gateway.

17. A method according to claim 14 or 15, wherein the media gateway sends information to the media gateway controller informing the media gateway controller of the structure of the termination identities of the media gateway terminations.

18. A method according to claim 14 or 15, wherein the media gateway controller sends structure information to the media gateway informing the media gateway of the structure of the termination identities to be used for the terminations of the media gateway, and the media gateway generates termination identities structured in accordance with the structure information received from the media gateway controller.

19. A method according to claim 14 or 15, further comprising a management interface for defining or provisioning the structure of the termination identities of the terminations of one or more media gateways.

20. A method according to claim 14 or 15, wherein the syntax of the termination identities is described in a MML (Man-Machine Language) format.

21. A method according to claim 14 or 15, wherein the structure information comprises a second parameter defining the order of one or more bit sequences in the structure information.

22. A method according to claim 14 or 15, wherein the structure information comprises a second parameter defining that part of the structure information which relates to circuit information.

23. A method according to claim 14 or 15, wherein the structure information comprises a second parameter defining that part of the structure information which relates to trunk information.

24. A method according to claim 14 or 15, wherein the structure information comprises a second parameter defining that part of the structure information which relates to trunk group information.

25. A media gateway controller, the media gateway controller comprising:
a communication interface configured to provide communication with a media gateway; and
a management interface configured to control the media gateway which assigns structured termination identities for identifying terminations of the media gateway that source or sink media or control streams, wherein the media gateway controller has access to structure information informing the media gateway controller of the structure of the termination identities, wherein the media gateway controller has knowledge of fixed generation rules for generating termination identities in the media gateway.

26. A media gateway controller, the media gateway controller comprising:
a communication interface configured to provide communication with a media gateway; and
a management interface configured to control the media gateway which assigns structured termination identities for identifying terminations of the media gateway that source or sink media control streams, wherein the media gateway controller has access to structure information informing the media gateway controller of the structure of the termination identities, wherein the structure information comprises a parameter defining the media gateway type to which the structure of the termination identities refers; and to use the structure information for defining one or more commands for simultaneously specifying one or more of the terminations of said media gateway.

27. A media gateway controller according to claim 25 or 26, wherein the media gateway controller is configured to send structure information to the media gateway informing the media gateway of the structure of the termination identities to be used for the terminations of the media gateway.

28. A media gateway controller according to claim 25 or 26, further comprising a management interface for defining or provisioning the structure of the termination identities of the terminations of one or more media gateways.

29. A media gateway controller according to claim 25 or 26, wherein the syntax of the termination identities is described in a MML (Man-Machine Language) format.

30. A media gateway controller according to claim 25 or 26, wherein the structure information comprises a parameter defining the order of one or more bit sequences in the structure information, or that part of the structure information which relates to circuit information, to trunk information or to trunk group information.

* * * * *

UNITED STATES PATENT AND TRADEMARK OFFICE
CERTIFICATE OF CORRECTION

PATENT NO. : 7,447,192 B1
APPLICATION NO. : 10/297993
DATED : November 4, 2008
INVENTOR(S) : Pekka Lehto It is certified that error appears in the above-identified patent and that said Letters Patent is hereby corrected as shown below:

On the Title page,

[*] Notice:  Subject to any disclaimer, the term of this patent is extended or adjusted under 35 USC 154(b) by (829) days Delete the phrase "by 829 days" and insert -- by 1,021 days --

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,447,192 B1 | Page 1 of 1 |
| APPLICATION NO. | : 10/297993 | |
| DATED | : November 4, 2008 | |
| INVENTOR(S) | : Pekka Lehto | |

It is certified that error appears in the above-identified patent and that said Letters Patent is hereby corrected as shown below:

On the cover page,

Item [*] Notice:   Subject to any disclaimer, the term of this patent is extended or adjusted under 35 USC 154(b) by (1,021) days Delete the phrase "by 1,021 days" and insert -- by 1,498 days --

Signed and Sealed this

Twentieth Day of April, 2010

David J. Kappos
*Director of the United States Patent and Trademark Office*